(12) United States Patent  
Park

(10) Patent No.: US 9,153,285 B2  
(45) Date of Patent: Oct. 6, 2015

(54) CONTENT PLAY DEVICE HAVING CONTENT FORMING FUNCTION AND METHOD FOR FORMING CONTENT THEREOF

(75) Inventor: Jung-il Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 643 days.

(21) Appl. No.: 12/549,830

(22) Filed: Aug. 28, 2009

(65) Prior Publication Data

US 2010/0138013 A1    Jun. 3, 2010

(30) Foreign Application Priority Data

Dec. 1, 2008 (KR) .......... 10-2008-0120494

(51) Int. Cl.
  *G10H 1/36* (2006.01)
  *G11B 27/034* (2006.01)
  *G11B 27/34* (2006.01)

(52) U.S. Cl.
  CPC ............ *G11B 27/034* (2013.01); *G11B 27/34* (2013.01)

(58) Field of Classification Search
  CPC .............. G10H 2220/106; G10H 2210/021; G06T 13/205
  See application file for complete search history.

(56) References Cited

U.S. PATENT DOCUMENTS

| | | | |
|---|---|---|---|
| 5,315,057 A * | 5/1994 | Land et al. ................ 84/601 |
| 5,355,762 A * | 10/1994 | Tabata ..................... 84/609 |
| 6,248,946 B1 * | 6/2001 | Dwek ...................... 84/609 |
| 6,352,432 B1 * | 3/2002 | Tsai et al. ............... 434/307 A |
| 6,392,133 B1 * | 5/2002 | Georges .................. 84/609 |
| 6,888,999 B2 * | 5/2005 | Herberger et al. ........ 386/278 |
| 7,071,402 B2 * | 7/2006 | Georges .................. 84/609 |
| 7,227,073 B2 * | 6/2007 | Kim ....................... 84/609 |
| 7,548,934 B1 * | 6/2009 | Platt et al. ............... 1/1 |
| 7,642,442 B2 * | 1/2010 | Adam et al. ............. 84/609 |
| 7,663,045 B2 * | 2/2010 | Schmidt et al. .......... 84/600 |
| 7,754,959 B2 * | 7/2010 | Herberger et al. ........ 84/626 |
| 7,863,511 B2 * | 1/2011 | McNally .................. 84/610 |
| 8,153,879 B2 * | 4/2012 | Bunya et al. ............. 84/612 |
| 2007/0101355 A1 * | 5/2007 | Chung et al. ............. 725/18 |
| 2007/0209499 A1 * | 9/2007 | Kotani .................... 84/644 |
| 2007/0230911 A1 * | 10/2007 | Terasaki .................. 386/96 |
| 2008/0190266 A1 * | 8/2008 | Kim et al. ................ 84/602 |
| 2008/0190268 A1 * | 8/2008 | McNally .................. 84/609 |

(Continued)

FOREIGN PATENT DOCUMENTS

JP    11-273320 A    10/1999

OTHER PUBLICATIONS

Communication dated Nov. 6, 2014 issued by the Korean Intellectual Property Office in counterpart Korean Application No. 10-2008-0120494.

*Primary Examiner* — Marlon Fletcher
(74) *Attorney, Agent, or Firm* — Sughrue Mion, PLLC

(57) ABSTRACT

A content play device capable of forming content and a method for forming content thereof. The method for forming content of the content play device, according to an exemplary embodiment of the present invention, comprises providing a content forming user interface (UI) which reflects a plurality of data to be played, receiving a play time of each of the plurality of data via the content forming UI, and forming content in which the plurality of data is reproduced according to a received play time of each data. Accordingly, a user may easily form content in which background music is set for each image file.

38 Claims, 5 Drawing Sheets

(56) References Cited

U.S. PATENT DOCUMENTS

| | | |
|---|---|---|
| 2008/0195981 A1* | 8/2008 | Pulier et al. ............... 715/974 |
| 2008/0232697 A1* | 9/2008 | Chen et al. ............... 382/225 |
| 2008/0247458 A1* | 10/2008 | Sun et al. ............... 375/240.01 |
| 2009/0205482 A1* | 8/2009 | Shirai et al. ............... 84/612 |
| 2009/0217804 A1* | 9/2009 | Lu et al. ............... 84/602 |
| 2010/0172591 A1* | 7/2010 | Ishikawa ............... 382/224 |
| 2010/0257994 A1* | 10/2010 | Hufford ............... 84/609 |

* cited by examiner

CONTENT PLAY DEVICE HAVING CONTENT FORMING FUNCTION AND METHOD FOR FORMING CONTENT THEREOF

CROSS-REFERENCE TO RELATED APPLICATION

This application claims priority under 35 U.S.C. §119 from Korean Patent Application No. 10-2008-0120494, filed on Dec. 1, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to a content play device having a content forming function and a method for forming content thereof, and more particularly, to a content play device capable of forming content on its own without an editing program and a method for forming content thereof.

2. Description of the Related Art

A content play device generally plays content which the device has already received. The content may be an image or a music file. If the content is an image file, the content play device displays the image file on the screen, and if the content is a music file, the content play device outputs the sound via a speaker by reproducing the music file. As such, the content play device reproduces a single item of data at a time.

If an editing program is used, however, a plurality of image files can be consecutively displayed on the screen while a music file is reproduced as background music, creating a new content. By doing so, a user may possess a new content which is created by combing an image file with a music file.

The problem is that most editing programs are very expensive and complicated to use. Therefore, even if a user has an editing program, it is very difficult to create content in the way the user wants to using the editing program.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

Exemplary embodiments of the present invention provide a content play device capable of forming content without an editing program by forming content according to a predetermined play time for each data, and a method for forming content thereof.

The method for forming content in a content play device, according to an exemplary embodiment of the present invention, includes providing a content forming user interface (UI) reflecting a plurality of data to be played, receiving a play time of each of the plurality of data via the content forming UI, and forming content in which the plurality of data is played according to the received play time of each data.

The plurality of data may include at least one of a first data and at least one of a second data.

The first data may be an image file and the second data may be a music file.

The content forming UI may include a first data list area which provides a list of the first data and a second data list area which provides a list of the second data.

The list of the first and the second data may be provided in a bar shape.

In providing the content forming UI, the first data list area may be evenly divided according to the number of the first data, and identifying information for each of the first data may be displayed on the divided area. A plurality of first pointers may be displayed on the border of the divided area to change a play time of the first data. The second data list area may be divided according to a play time of the second data, and identifying information for each of the second data may be displayed on the divided area. A plurality of second pointers may be displayed on the border of the divided area to change play time of the second data.

In providing the content forming UI, a play time for each of the first data may be further displayed in the divided area of the first data list area with reference to the entire play time of the second data, and play time of each of the second data may be further displayed in the divided area of the second data list area.

In receiving the play time, a play time added to the originally allocated play time for the first data as the first pointer moves and a play time added to the originally allocated play time for the second data as the second pointer moves may be received.

A content play device, according to an exemplary embodiment of the present invention, comprises a user interface unit which provides a content forming UI reflecting a plurality of data to be played and a content forming unit which forms content to play each of the plurality of data according to a play time received for each data.

The plurality of data may include at least one of a first data and at least one of a second data.

The first data may be an image file and the second data may be a music file.

The content forming UI may comprise a first data list area which provides a list of the first data and a second data list area which provides a list of the second data.

The first and the second list may be provided in a bar shape.

The user interface unit may provide the content forming UI in which the first data list area is evenly divided according to the number of the first data, and identifying information for each of the first data is displayed on the divided area. A plurality of first pointers are displayed on the border of the divided area to change a play time of the first data. The second data list area is divided according to a play time of the second data, and identifying information for each of the second data is displayed on the divided area. A plurality of second pointers are displayed on the border of the divided area to change a play time of the second data.

The user interface unit may provide the content forming UI in which a play time of for each of the first data is further displayed in the divided area of the first data list area with reference to the entire play time of the second data, and a play time of each of the second data is further displayed in the divided area of the second data list area.

The user interface unit may receive a play time added to the originally allocated play time for the first data as the first pointer moves, and a play time added to the originally allocated play time for the second data as the second pointer moves.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
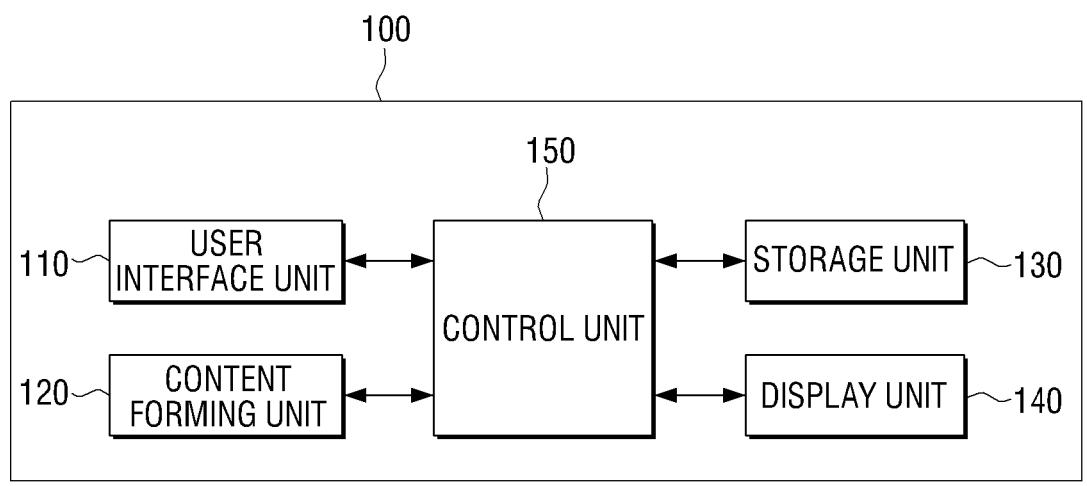
FIG. 1 is a block diagram of a content play device according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram of a content display device according to an exemplary embodiment of the present invention.

Referring to FIG. 1, the content play device 100, according to the exemplary embodiment of the present invention, comprises a user interface 110, a content forming unit 120, a storage unit 130, a display unit 140, and a control unit 150.

The user interface unit 110 receives a request signal to form content from a user. The user interface unit 110 provides a content forming user interface (UI) which reflects a plurality of data to be played, and receives a play time for each of the plurality of data.

The plurality of data includes a first data and a second data. The first data represents an image file and the second data represents a music file. That is, the first data may be files with the extensions of GIF and JPG, and the second data may be files with the extensions of MP3 and WAV.

The user interface unit 110 composes a content forming user interface (UI) which takes a usage pattern of a user into consideration. The content forming UI includes a first data list area for providing a list of the first data and a second data area for providing a list of the second data. The first data list and the second data list are provided in a bar shape.

When composing the content forming UI, the user interface unit 110 divides the first data list area evenly according to the number of the first data, and displays identifying information of the first data in each of the divided areas. The user interface unit 110 divides the second data list area according to the play time of the second data, and displays identifying information of the second data in each of the divided areas. The first and second pointers are displayed on the border of the divided areas of the first and second data list areas to change the play time of the second data.

The content forming UI provided by the user interface unit 110 is explained in detail below with reference to FIGS. 2b and 2c.

The content forming unit 120 forms content in which a plurality of data received from the user interface unit 110 is played according to the play time of each data. In the content formed by the content forming unit 120, a plurality of image files are displayed consecutively according to their play time, and a plurality of music files are played according to their play time.

The storage unit 130 stores information necessary for the content forming device 100. The storage unit 130 stores a plurality of data, that is, the first and second data and content formed by the content forming unit 120.

The display unit 140 displays information which is provided to a user by the content play device 100. The display unit 140 may display the content forming UI composed by the user interface unit 110.

If the content play device 100 is a television, the display unit 140 may be a display panel such as a liquid crystal display (LCD) and a plasma display panel (PDP) which displays an image of broadcasting information.

The control unit 150 controls comprehensive functions of the content play device 100. That is, the control unit 150 controls the input and/or output of signals between the user interface unit 110, the content forming unit 120, the storage unit 130, and the display unit 140.

Figure 2A:
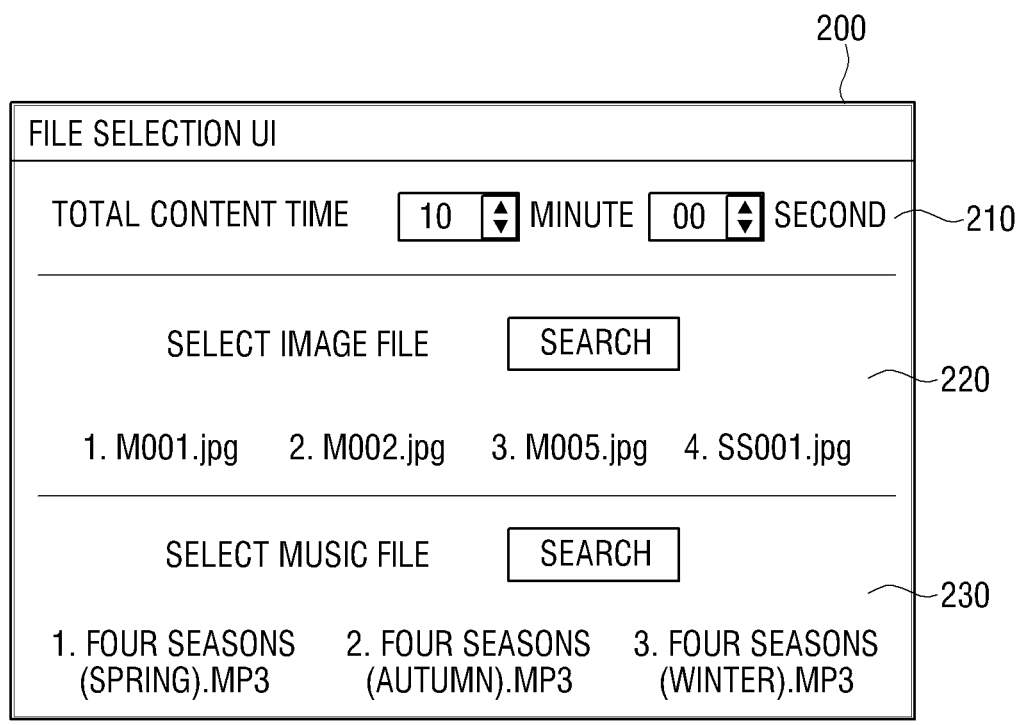
FIGS. 2a, 2b and 2c are schematic views illustrating a user interface (UI) for forming content according to an exemplary embodiment of the present invention.
Figure 2B:
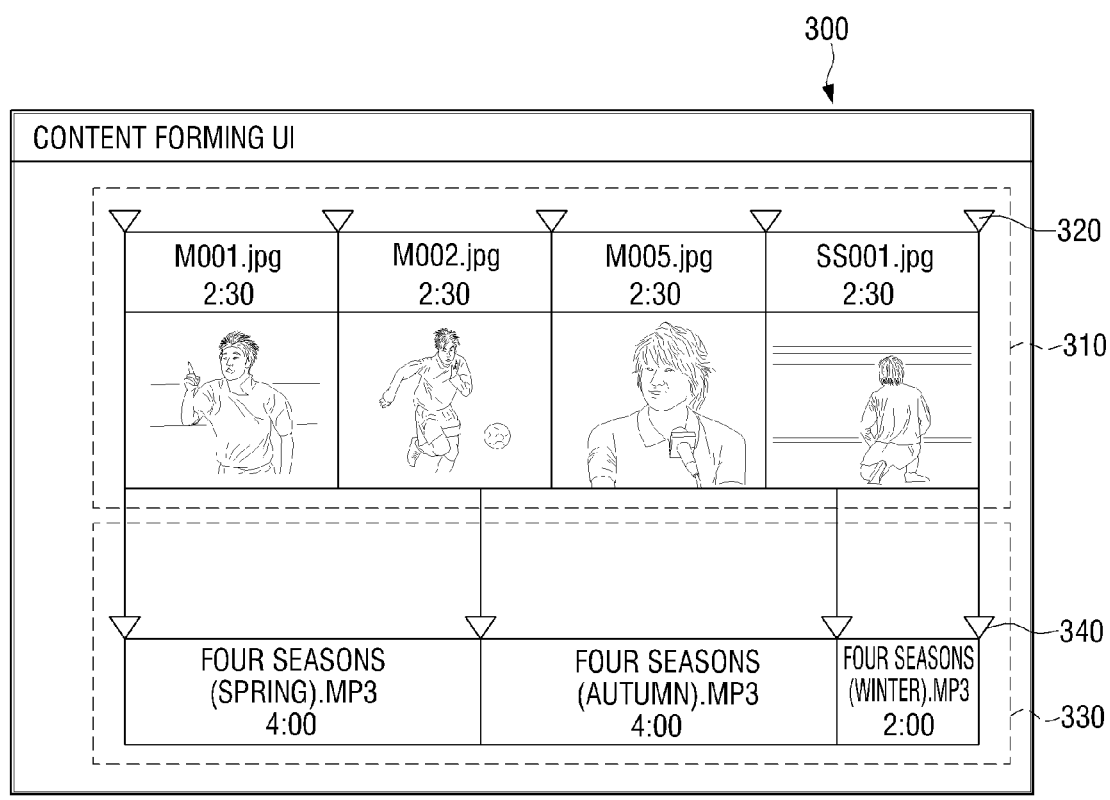
Figure 2C:
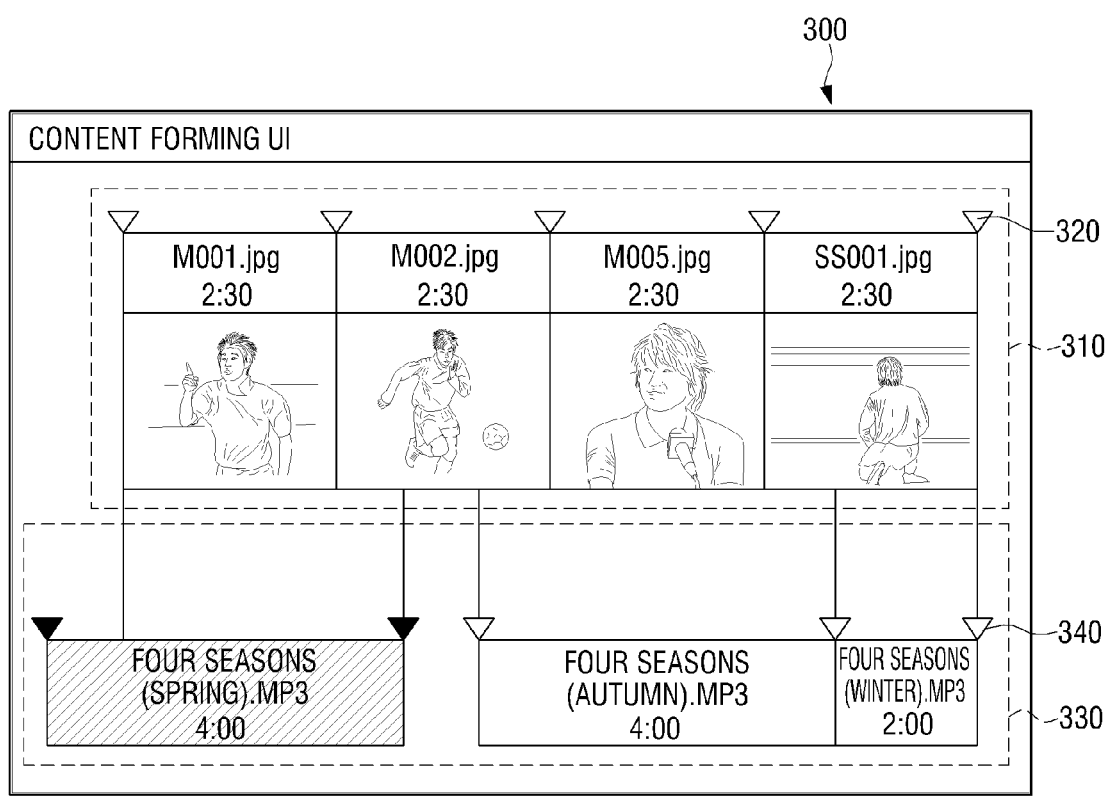

FIGS. 2a, 2b and 2c are schematic views illustrating the content forming UI according to an exemplary embodiment of the present invention.

FIG. 2a illustrates a screen of the file selection UI 200 which is provided to the user if a user requests to form content via the user interface unit 110.

The file selection UI 200 can be divided into an area which sets a total play time of content (210), an area which selects an image file to be included in content (220), and an area which selects a music file to be included in content (230).

In FIG. 2a, a user desires to form content lasting a total of 10 minutes and selects 4 image files and 3 music files, but this is only an example provided to promote a better understanding of the process of data selection.

In FIG. 2a, if the user selects a plurality of image files and music files, the user interface unit 110 composes the content forming UI 300 which directly reflects the selected image files and music files, and displays them via the display unit 140.

As illustrated in FIG. 2b, the content forming UI 300 is divided into the first data list area 310 and the second data list area 330. The first data list area 310 and the second data list area 330 may provide each list in the form of horizontal bar, or the list may be provided vertically so that a play time of each data can be easily compared.

According to an exemplary embodiment of the present invention, the first data list area 310 and the second data last area 330 provide lists horizontally, but this is merely an example, and the lists can be provided vertically.

However, the bars in which the first data list area 310 and the second data list area 330 are provided should face each other in the same length in order to make it possible to compare a play time of the first and second data, and to make it easier to set the second data while the first data is played.

The first data list area 310 is evenly divided according to the number of image files selected by the file selection UI 200 in FIG. 2a. Identifying information of each image file is displayed in each divided area, and the identifying information may be a file name of each image file.

The first pointer 320 is formed on the border of the divided areas of the first data list area 310 to change the play time of the first data. A user may change the play time of the first data by changing the location of the first pointer 320.

For instance, suppose that the first data list area 310 is set to be 10 minutes. Since 4 image files are selected by the file selection UI 200 in FIG. 2a, the first data list area 310 is divided into 4 areas, and the play time of 2 minutes and 30 seconds along with the name of image file is displayed in each divided area. As it may not be easy to identify each image file only by the name of file, a thumbnail of each image file can be further displayed in each divided area.

The second data list area 330 may be divided according to a play time of a music file regardless of the number of music files selected by the file selection UI 200 in FIG. 2a.

If the total play time of the selected music file is less than the time set in the second data list area 330, there will be extra time at the end of the second data list area 330. On the contrary, if the total play time of the selected music files exceeds the time set in the second data list area 330, a part of a music file which is selected for the last time may not be played.

For instance, suppose that the play time of the 3 music files selected by the file selection UI 200 in FIG. 2a is 4 minutes, and the second data list area 330 is set to be 10 minutes. Each of the first 2 music files, which are "four seasons (spring).MP3" and "four seasons (autumn).MP3", takes up four-tenths of the area, and "four seasons (winter).MP3" takes up only two-tenths of the area.

Identifying information of each music file is displayed in each divided area of the second data list area (330). The identifying information of a music file may be the name of file. A plurality of the second pointers (340) are formed on the border of each divided area to change the play time of the music files. A user may change the play time of a music file by changing the location of the second pointer (340) using a mouse.

A user may change the play time of the four image files and the three music files using the content forming UI 300 as illustrated in FIG. 2b. That is, different background music can be set for each image file. Also, only part of a music file can be played.

If a user does not desire to play the front part of "four seasons (spring).MP3", a user may select the divided areas of "four seasons (spring).MP3" using a mouse as illustrated in FIG. 2c. The second pointer 340, which is formed on the border of the divided areas of "four seasons (spring).MP3", becomes a pointer to change a play time of "four seasons (spring). MP3". If a user changes the location of the second pointer 340 in the front part of the divided area of "four seasons (spring).MP3", the corresponding front area of the music file is not played.

As such, by changing the location of the second pointer 340 on the border of the divided area of the music file, a user may set a certain portion of the front or last part of the music file not to be played.

If the play time of an image file or a music file is set as illustrated in FIG. 2c, "M001.jpg", "M002.jpg", "M005.jpg", and "SS001.jpg" are played consecutively for 2 minutes and 30 seconds. During the 2 minutes and 30 seconds that "M001.jpg" is played, "four seasons (spring).MP3" excluding some front part is played, while one-third of "M002.jpg" is displayed, a last part of "four seasons (spring).MP3" is played, while another one-third of "M002.jpg" is displayed, no music is played, and while the last one-third of "M002.jpg" is displayed, the beginning part of "four seasons (autumn).MP3" is played. While the 2 minutes and 30 seconds that "M005.jpg" is displayed, the previously played "four seasons (autumn).MP3" is played until one-third of "SS001.jpg" is displayed, and then "four seasons (winter).MP3" is played for about 2 minutes.

Figure 3:
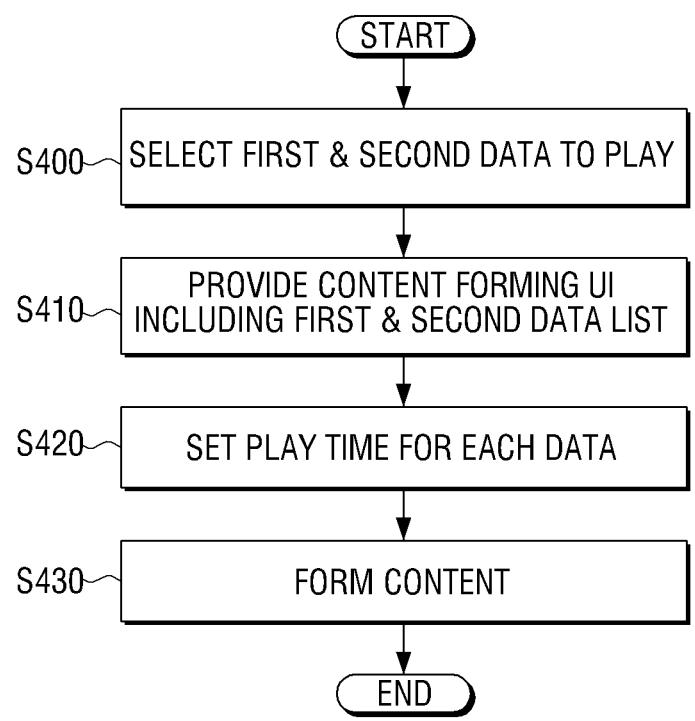
FIG. 3 is a flow chart illustrating a method of forming content according to an exemplary embodiment of the present invention.

FIG. 3 is a flow chart illustrating a method for forming content according to an exemplary embodiment of the present invention.

The method for forming content according to the exemplary embodiment of the present invention will be explained with reference to FIGS. 1, 2a, 2b, 2c, and 3.

If a user requests the content forming device 100 to form content, the request signal to form content is received via the user interface unit 110. The user interface unit 110 displays the file selection UI 200 on the display unit 140, and then the user selects a plurality of data to form content, that is, to select image files and music files using the file selection UI 200 (S400). The file selection UI 200 may have a structure as illustrated in FIG. 2a.

If a plurality of image files and music files are selected via the file selection UI 200, the user interface unit 110 composes the content forming UI 300 including the list of selected image files and music files and displays them on the display unit 140 (S410). The file selection UI 300 may have a structure as illustrated in FIG. 2b.

The user sets a play time for each of the plurality of image files and music files using the first and second pointers in the first and second data list areas included in the content forming UI 300 (S420).

If the play time is set for the plurality of image files and music files by the content forming UI 300, the content forming unit 120 forms content in which the image files and music files are played for the play time set for each file (S430).

As such, the user is provided with the content forming UI 300 in which a list of plurality of image files and music files that the user selected is displayed in a bar shape. The user adjusts play time of an image file referring to the first data list area 310 of the content forming UI 300, and adjusts play time of a music file referring to the second data list area 330.

In short, the user may form content which displays a plurality of image files distinctively while playing different background music for each image file, without using a complicated editing program.

The foregoing exemplary embodiments and advantages are merely exemplary and are not to be construed as limiting the present invention. The present teachings can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for forming content in a content play device, the method comprising:
    providing a content forming user interface (UI) comprising a first area for displaying first graphic items for image content and a second area for displaying second graphic items for music content;
    in response to selecting at least one of the first graphic items, providing a plurality of first UI items on the border of the selected first graphic item for setting a play time of an image content corresponding to the selected first graphic item;
    setting a play time of the image content based on a command received via at least one of the plurality of first UI items; and
    forming a content in which the image content and the music content are associated to be played together according to the set play time via the at least one of the plurality of first UI items.

2. The method for forming content as claimed in claim 1, wherein each of the first area and the second area is provided in a bar shape.

3. The method of claim 1, wherein
    the plurality of first UI items comprise a start pointer icon and an end pointer icon at a starting border and an ending border dividing the selected first graphic item, and wherein the start pointer icon and the end pointer icon of the first selected graphic item are concurrently displayed and independently movable in a horizontal direction to select the play time for the image content corresponding to the selected first graphic item.

4. The method of claim 1, further comprising:
in response to selecting at least one of the second graphic items, providing, in the content forming UI, a start pointer icon and an end pointer icon at a starting border and an ending border dividing the selected second graphic item, and
wherein the start pointer icon and the end pointer icon of the selected second graphic item are concurrently displayed and at least one of the start pointer icon and the end pointer icon of the selected second graphic item is movable in a horizontal direction to select a play time for a music content corresponding to the selected second graphic item.

5. The method of claim 4, further comprising:
playing the music content according to respective play time thereof while displaying the image content according to respective play time thereof.

6. The method of claim 5, wherein if a total play time for the music content exceeds a total play time for the image content, the play time of a last one of the music content is automatically reduced such that the total play time for the image content corresponds to the total play time for the music content.

7. The method for forming content as claimed in claim 1, wherein the first area and the second area are provided in non-overlapping areas of the content forming UI.

8. The method of claim 1, further comprising:
in response to selecting at least one of the second graphic items, providing a plurality of second UI items on the border of the selected second graphic item for setting a play time of music content corresponding to the selected second graphic item; and
setting a play time of the music content based on a command received via at least one of the plurality of second UI items;
forming a content in which the image content and the music content are associated to be played together according to the set play time via the at least one of the plurality of first UI items and the at least one of the plurality of second UI items.

9. The method of claim 1, wherein each of the image content is initially assigned a predetermined play duration.

10. The method of claim 1, wherein the image content and the music content are selected via a content selection UI.

11. The method of claim 1, wherein the image content and the music content are selected via the content forming UI.

12. A method for forming content in a content play device, the method comprising:
providing a content forming user interface (UI) comprising a first area for providing a first graphic items for image content and a second area for providing second graphic items for music content;
receiving a play time for at least one of the image content and the music content via the first graphic items and the second first graphic items in the content forming UI; and
forming a content in which the image content and the music content are associated to be played together according to the received play time,
wherein in the providing the content forming UI,
each of the image content corresponding to each of the first graphic items is initially assigned a predetermined play duration, and in response to selecting a first graphic item among the first graphic items, a plurality of first UI items for setting a play time for an image content corresponding to the selected first graphic item items is displayed on the border of the selected first graphic item to change a play time of the image content, and
a horizontal length of each of the second graphic items corresponds to a play duration of a corresponding music content and identification information for each of the second graphic items is displayed, and in response to selecting a second graphic item among the second graphic items, a plurality of second UI items are displayed on the border of the selected second graphic item to change a play time of a music content corresponding to the selected second graphic item.

13. The method for forming content as claimed in claim 12, wherein a length of at least one of the second graphic items is automatically set based on a total play time for the first graphic items.

14. The method for forming content as claimed in claim 12, wherein a play duration of a music content which corresponds to at least one of the second graphic items is automatically set based on a total play time for the first graphic items.

15. The method for forming content as claimed in claim 12, wherein the image content and the music content are selected via a content selection UI.

16. The method for forming content as claimed in claim 12, wherein the image content and the music content are selected via the content forming UI.

17. A content play device comprising:
a display unit;
a control unit configured to control the display unit to display a content forming UI including a first area for displaying first graphic items for image content and a second area for displaying second graphic items for music content,
wherein, in response to selecting at least one of the first graphic items, the control unit is configured to control to provide a plurality of first UI items on the border of the selected first graphic item for setting a play time of an image content corresponding to the selected first graphic item,
wherein the control unit is configured to set a play time of the image content based on a command received via at least one of the plurality of first UI items, and
wherein the control unit is configured to generate a content in which the image content and the music content are associated to be played together according to the set play time via the at least one of the plurality of first UI items.

18. The content play device as claimed in claim 17, wherein each of the first area and the second area is provided in a bar shape.

19. The content play device as claimed in claim 17, wherein the control unit displays the content forming UI in which a play time of each graphic item of the first graphic items is displayed in a divided area of the first data list area with reference to an entire play time of the second graphic items, and a play time of each graphic item of the second graphic items is displayed in the divided area of the second data list area.

20. The content play device as claimed in claim 17, wherein the first area and the second area are provided in non-overlapping areas of the content forming UI.

21. The content play device as claimed in claim 17, wherein the plurality of first UI items comprise a start pointer icon and an end pointer icon at a starting border and an ending border dividing the selected first graphic item, and wherein the start pointer icon and the end pointer icon of the first selected graphic item are concurrently displayed and independently movable in a horizontal direction to select the play time for the image content corresponding to the selected first graphic item.

22. The content play device as claimed in claim 17, wherein, in response to selecting at least one of the second graphic items, the control unit is further configured to provide, in the content forming UI, a start pointer icon and an end pointer icon at a starting border and an ending border dividing the selected second graphic item, and wherein the start pointer icon and the end pointer icon of the selected second graphic item are concurrently displayed and at least one of the start pointer icon and the end pointer icon of the selected second graphic item is movable in a horizontal direction to select a play time for a music content corresponding to the selected second graphic item.

23. The content play device as claimed in claim 22, wherein the control unit is further configured to play the music content according to respective play time thereof while displaying the image content according to respective play time thereof.

24. The content play device as claimed in claim 17, wherein, in response to selecting at least one of the second graphic items, the control unit is configured to provide a plurality of second UI items on the border of the selected second graphic item for setting a play time of music content corresponding to the selected second graphic item, wherein the control unit is configured to set a play time of the music content based on a command received via at least one of the plurality of second UI items, and wherein the control unit is configured to generate a content in which the image content and the music content are associated to be played together according to the set play time via the at least one of the plurality of first UI items and the at least one of the plurality of second UI items.

25. The content play device as claimed in claim 17, wherein each of the image content is initially assigned a predetermined play duration.

26. The content play device as claimed in claim 17, wherein the image content and the music content are selected via a content selection UI.

27. The content play device as claimed in claim 17, wherein the image content and the music content are selected via the content forming UI.

28. A content play device comprising:
a display unit;
a control unit configured to control the display unit to display a content forming user interface(UI) comprising a first area for providing first graphic items for image content, and a second area for providing second graphic items for music content,
wherein the control unit is configured to receive a play time for at least one of the image content and the music content via the first graphic items and the second first graphic items in the content forming UI, and to form a content in which the image content and the music content are associated to be played together according to the received play time,
wherein each of the image content corresponding to each of the first graphic items is initially assigned a predetermined play duration, and in response to selecting a first graphic item among the first graphic items, the control unit controls the display unit to display a plurality of first UI items for setting a play time for an image content corresponding to the selected first graphic item items on the border of the selected first graphic item to change a play time of the image content, and wherein a horizontal length of each of the second graphic items corresponds to a play duration of a corresponding music content and identification information for each of the second graphic items is displayed, and in response to selecting a second graphic item among the second graphic items, the control unit controls the display unit to a plurality of second UI items on the border of the selected second graphic item to change a play time of a music content corresponding to the selected second graphic.

29. The content play device as claimed in claim 28, wherein the content forming UI comprises a plurality of pointers for specifying playback times.

30. The content play device as claimed in claim 28, wherein a length of at least one of the second graphic items is automatically set based on a total play time for the first graphic items.

31. The content play device as claimed in claim 28, wherein a play duration of a music content which corresponds to at least one of the second graphic items is automatically set based on a total play time for the first graphic items.

32. The content play device as claimed in claim 28, wherein the image content and the music content are selected via a content selection UI.

33. The content play device as claimed in claim 28, wherein the image content and the music content are selected via the content forming UI.

34. An apparatus for providing a content forming function comprising:
a display unit; and
a control unit to providing a content forming user interface (UI) on the display unit, the content forming UI including a first area associated with first graphic items for a plurality of image files and a second area associated with second graphic items for a plurality of music files, the content forming UI further including first pointers on borders of a selected first graphic item and second pointers on borders of a selected second graphic item, the control unit to receive an input via the content forming UI to move one or more of the first pointers to change a play time duration of a respective one of the image files corresponding to the selected first graphic item, and to receive an input via the content forming UI to move one or more of the second pointers to change a play time duration of a respective one of the music files corresponding to the selected second graphic item,
wherein audio contents of the music files are playable, via the content forming UI, according to respective play time durations thereof while visual contents of the image files are played according to respective play time durations thereof, and
wherein if a total play time duration for the plurality of music files exceeds a total play time duration for the plurality of image files, the content forming UI automatically reduces the play time duration for a last one of the music files such that the total play time duration for the image files corresponds to the total play time duration for the music files.

35. The apparatus of claim 34, wherein, in the content forming UI, a start pointer of the first pointers is located at a starting border of the selected first graphic item and an end pointer of the first pointers is located at an ending border of the selected first graphic item,
wherein the start pointer and the end pointer for the selected first graphic item are concurrently displayed and a user command to select a play start time and a play end time for an image file corresponding to the selected first graphic item is received via the start pointer and the end pointer.

36. The apparatus of claim 35, wherein, in the content forming UI, a start pointer of the second pointers is located at a starting border of the selected second graphic item and an end pointer of the second pointers is located at an ending border of the selected second graphic item, wherein the start pointer and the end pointer for the selected second graphic item are concurrently displayed and a user command to select a play start time and a play end time for a music file corresponding to the selected second graphic item is received via the start pointer and the end pointer.

37. The apparatus of claim 34, wherein the first graphic items and the second graphic items are provided in a bar shape of which a horizontal size is changed according to the user command received via the first pointers or the second pointers for a respective first graphic item or a respective second graphic item.

38. The apparatus of claim 34, wherein the total play time duration for the image files and the total play time duration for the music files are equal.

\* \* \* \* \*